United States Patent
Al-Helal et al.

(10) Patent No.: US 12,529,662 B2
(45) Date of Patent: Jan. 20, 2026

(54) BUILT-IN SYSTEM FOR INSPECTION, TESTING AND SAMPLING OF CASTED OR ADDITIVE MANUFACTURED MATERIAL

(71) Applicant: SAUDI ARABIAN OIL COMPANY, Dhahran (SA)

(72) Inventors: Zakariya Saleh Al-Helal, Dhahran (SA); Carlos Ernesto Acero, Dhahran (SA); Nagi Elbashir, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 267 days.

(21) Appl. No.: 17/939,719

(22) Filed: Sep. 7, 2022

(65) Prior Publication Data

US 2024/0077429 A1 Mar. 7, 2024

(51) Int. Cl.
*G01N 21/954* (2006.01)
*G01N 21/88* (2006.01)

(52) U.S. Cl.
CPC ....... *G01N 21/954* (2013.01); *G01N 21/8803* (2013.01); *G01N 2021/9544* (2013.01)

(58) Field of Classification Search
CPC ............ G01N 21/954; G01N 21/8803; G01N 2021/9544; G01N 21/01
USPC .............. 356/240.1, 432, 70, 335, 337, 477
See application file for complete search history.

(56) References Cited

U.S. PATENT DOCUMENTS

| | | | | |
|---|---|---|---|---|
| 5,339,905 A * | 8/1994 | Dowker | ................ | E21B 43/16 166/324 |
| 5,460,224 A * | 10/1995 | Schalla | ................ | E21B 43/121 166/264 |
| 5,822,057 A * | 10/1998 | Samman | ................ | G02B 23/26 356/237.1 |
| 5,934,393 A * | 8/1999 | Marshall | ................ | E21B 25/02 175/246 |
| 5,969,242 A * | 10/1999 | Hubbell | ................ | E21B 47/047 73/152.55 |
| 6,029,744 A * | 2/2000 | Baird | ................ | E21B 49/083 166/264 |
| 6,029,758 A * | 2/2000 | Novacovicci | ........... | E21B 25/02 175/246 |
| 6,209,569 B1 * | 4/2001 | Sharp | ................ | B67D 7/3209 137/68.14 |

(Continued)

FOREIGN PATENT DOCUMENTS

| | | |
|---|---|---|
| CN | 110514663 A | 11/2019 |
| JP | 2001227925 A | 8/2001 |
| WO | 2016006049 A1 | 1/2016 |

OTHER PUBLICATIONS

Ramani et al., "Monitoring chloride ingress in concrete using an imaging probe sensor with sacrificial metal foil", Automation in Construction, vol. 117, Sep. 2020.

(Continued)

*Primary Examiner* — Isiaka O Akanbi
(74) *Attorney, Agent, or Firm* — Bracewell LLP; Constance G. Rhebergen; Keith R. Derrington

(57) ABSTRACT

Systems and methods for condition assessment of a formed material include a testing tube in contact with the formed material. An access tube is in contact with the formed material and with a testing end open to the testing tube. A tube cap is located at a cap end of the access tube. The cap end is opposite the testing end of the access tube. The access tube has an internal bore sized to provide passage for a testing tool.

19 Claims, 3 Drawing Sheets

(56) References Cited

U.S. PATENT DOCUMENTS

| | | | | |
|---|---|---|---|---|
| 7,958,936 | B2* | 6/2011 | McGregor | E21B 49/10 |
| | | | | 166/264 |
| 2003/0037692 | A1* | 2/2003 | Liu | F42B 1/032 |
| | | | | 102/301 |
| 2007/0051192 | A1* | 3/2007 | Penza | F16L 55/30 |
| | | | | 73/865.8 |
| 2008/0023075 | A1* | 1/2008 | Bravo | B67D 7/3209 |
| | | | | 137/312 |
| 2008/0190045 | A1* | 8/2008 | Janesky | E02D 31/02 |
| | | | | 52/169.5 |
| 2010/0025008 | A1* | 2/2010 | Walford | F28F 17/005 |
| | | | | 165/45 |
| 2010/0101160 | A1* | 4/2010 | Bongiorno | E04C 5/03 |
| | | | | 52/741.3 |
| 2011/0030298 | A1* | 2/2011 | Paul | E02D 27/01 |
| | | | | 249/34 |
| 2011/0209882 | A1* | 9/2011 | Enis | E21B 43/164 |
| | | | | 166/402 |
| 2013/0020077 | A1* | 1/2013 | Irani | E21B 49/10 |
| | | | | 166/264 |
| 2015/0300154 | A1* | 10/2015 | Hallundbæk | E21B 47/06 |
| | | | | 166/250.17 |
| 2020/0340781 | A1* | 10/2020 | Jervis | E21B 23/14 |
| 2023/0117471 | A1* | 4/2023 | Al-Malki | E21B 49/081 |
| | | | | 166/264 |

OTHER PUBLICATIONS

Saudi Arabian 1st Examination Report, Application No. 123450156, dated Sep. 19, 2024.

* cited by examiner

BUILT-IN SYSTEM FOR INSPECTION, TESTING AND SAMPLING OF CASTED OR ADDITIVE MANUFACTURED MATERIAL

BACKGROUND OF THE DISCLOSURE

1. Field of the Disclosure

The disclosure relates generally to the inspection and testing of casted or additive manufactured material and in particular, to systems and methods for assessing internal or external features of a concrete structure by way of preinstalled access features for inspection.

2. Description of the Related Art

After being formed, casted material or additive manufactured materials, such as a concrete structure or a structure formed by 3-D printing, can be subjected to internal and external inspections to assess the condition of the concrete structure. Casted material or additive manufactured materials can undergo physical, chemical, and visual inspection and testing to evaluate the health of the material and identify any concerning conditions of the material, such as cracks or deterioration. As an example, concrete foundations that can be partially buried can undergo physical, chemical, and visual inspection and testing to determine if the foundation requires any reconditioning or repairs.

SUMMARY OF THE DISCLOSURE

A current practice for evaluating the condition of an in-place structure formed by a casted material or that is additive manufactured, such as for example, a buried foundation, is to excavate around the structure and conduct external assessment methods such as ultrasonic testing. In certain cases this requires exposing the external surface of the structure for inspection. The assessment is limited to the exposed area, and nondestructive testing methods or destructive testing methods can penetrate the structure and measure its condition to a limited depth.

Conducting an excavation around a structure is a challenging task in facilities that process, for example, flammable materials such as oil. In addition, the excavation may result in instability of the structure or the area surrounding the structure and result in unsafe working or operating conditions. Furthermore, some current inspection practices would require permission for excavation, involvement of the engineering team, and close monitoring or attendance of the operations team to ensure structure integrity and operation safety during the inspection. Such current practice is costly, time consuming, conducted to a limited area, does not examine the structure in depth, and, in some cases, is intrusive.

In order to examine the structure internally, holes can be drilled, cored, or otherwise formed in the structure. Perforation of the structure would require later filling such perforations with grout or another material to close the created holes in the structure, and the process is destructive and can cause more damage to deteriorated concrete in addition to the possibility to damage or cut steel.

Embodiments disclosed herein provide systems and methods for the construction and inspection of structures with a pre-installed system for condition assessment. Systems and methods of this disclosure provide for the installation of internal or external tubes or channels into the structure during construction of the structure. Such tubes or channels can later be used for condition assessment of such structure. Embodiments of this disclosure provide access to examine the structure physically and visually and allow for samples of the structure to be gathered for chemical examination. The systems and methods of this disclosure can be used in connection with structures that are fabricated of formed materials. As used in this disclosure, the term "formed materials" includes casted material and additive manufactured materials. Casted materials can include cements, concrete, gypsum, or other materials that are formed by casting. Additive manufactured materials can include materials that are formed by 3-D printing, selective laser melting, electron beam manufacturing, or other additive techniques.

In an embodiment of this disclosure a system for condition assessment of a formed material includes a testing tube in contact with the formed material. An access tube can be in contact with the formed material and have a testing end open to the testing tube. A tube cap is located at a cap end of the access tube. The cap end is opposite the testing end of the access tube. The access tube has an internal bore sized to provide passage for a testing tool.

In alternate embodiments, the testing tube can extend entirely within the formed material. Alternately, the testing tube can be secured to an outer surface of the formed material.

In other alternate embodiments, an access pipe can extend from the access tube to an access opening. An access cap can be located at the access opening of access pipe. The access opening can be at a terminal end of the access pipe opposite a junction of the access pipe and the access tube. The access opening can be spaced apart from the formed material. The access opening can be sized to provide passage for a testing tool through the access opening to reach the testing tube.

In yet other alternate embodiments, the access pipe can extend along a manufactured element of the formed material. The access pipe can be removable. The tube cap can be located at an outer surface of the formed material. The testing tube can extend, for example, in any direction relative to a surface of the formed material and the access pipe can extend in any direction towards the access tube. The testing tool can be a directional drill. Alternately, the testing tool can be a borescope. Alternately, the testing tool can be a vacuum for sample collection.

In an alternate embodiment of this disclosure, a method for assessing a condition of a formed material with a system for a condition assessment includes positioning a testing tube in contact with the formed material. An access tube is located in contact with the formed material such that a testing end of the access tube is open to the testing tube. A tube cap is located at a cap end of the access tube, the cap end being opposite the testing end of the access tube. A testing tool is passed through an internal bore of the access tube to reach the testing tube.

In other alternate embodiments, positioning the testing tube in contact with the formed material can include extending the testing tube entirely within the formed material. Alternately, positioning the testing tube in contact with the formed material can include securing the testing tube to an outer surface of the formed material.

In yet other alternate embodiments, an access pipe can extend from the access tube to an access opening. An access cap can be located at the access opening of access pipe, where the access opening is at a terminal end of the access pipe opposite a junction of the access pipe and the access tube and the access opening is spaced apart from the formed material. A testing tool can be passed through the access opening to reach the testing tube.

In still other alternate embodiments, the access pipe can be extended along a manufactured element of the formed material. The testing tube can be extended in any direction relative to a surface of the formed material, and the access pipe can be extended in any direction towards to the access tube. The access pipe can be removable.

In other alternate embodiments, the testing tool can be a directional drill, and the method can further include obtaining a sample from the formed material by drilling into the formed material with the directional drill. Alternately, the testing tool can be a borescope, and the method can further include visually inspecting the formed material with the borescope.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION

Embodiments of the present disclosure will now be described more fully hereinafter with reference to the accompanying drawings, which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details.

Figure 1:
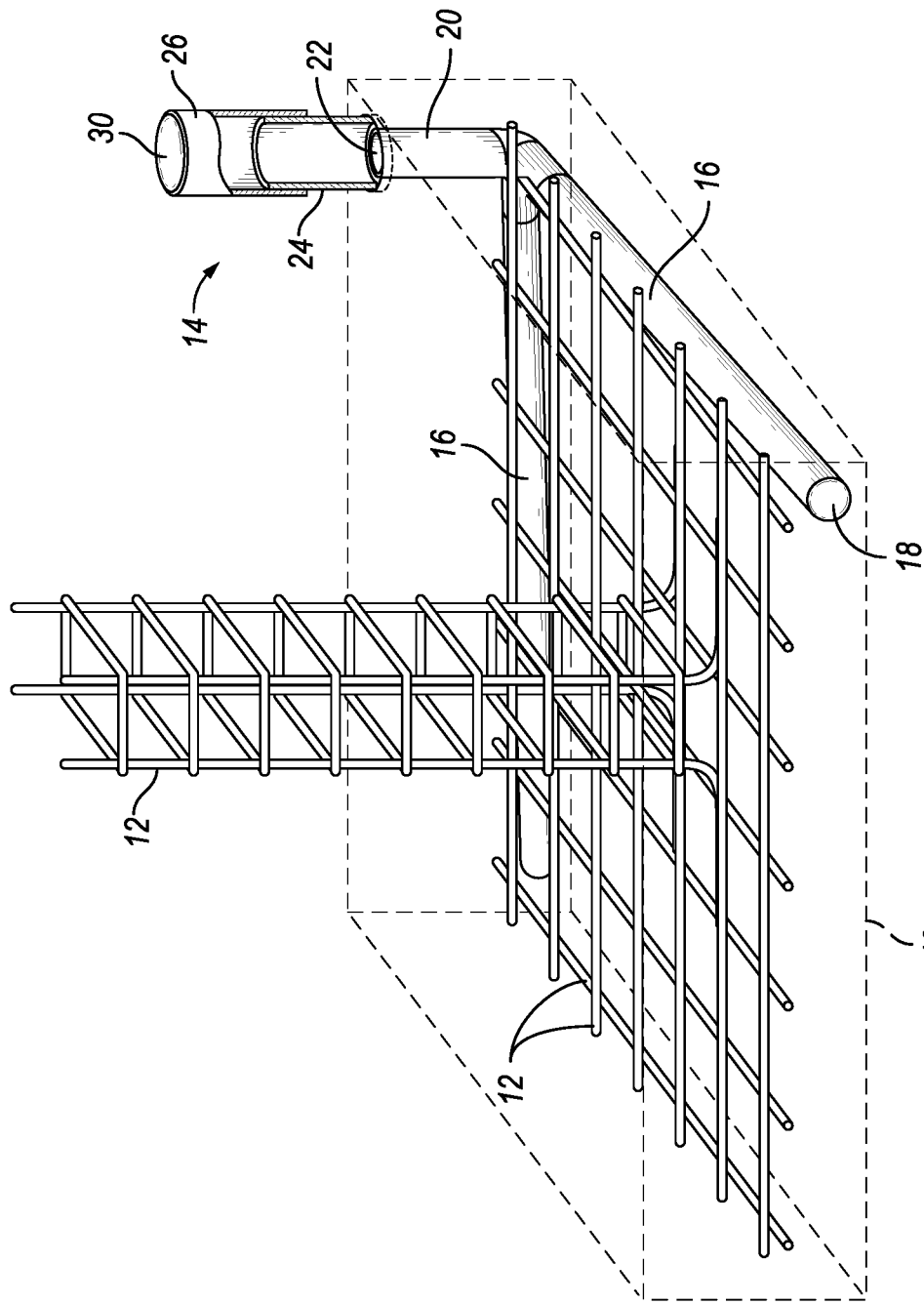
FIG. 1 is a schematic perspective view of a concrete structure with a pre-installed system for condition assessment, in accordance with an embodiment of this disclosure.

Looking at FIG. 1, a formed material can be a concrete structure 10 that may have testing and inspection requirements. Concrete structure 10 is shown as a concrete form that includes interior reinforcement material 12. As an example, concrete structure 10 can be a slab, a portion of a building or other structure, a basement, a foundation, a roof, or a beam. Reinforcing material 12 can be, for example, a rebar, welded wire mesh, wire or other fabric, other known concrete reinforcing members, or combinations of such reinforcing materials.

When concrete structure 10 is being constructed, a system for condition assessment 14 can be incorporated into concrete structure 10. In the example embodiment of FIG. 1, the system for condition assessment 14 includes features that are both internal to and external of concrete structure 10.

The internal features of the system for condition assessment 14 include a testing tube 16 in contact with concrete structure 10. Testing tube 16 extends through or adjacent to concrete structure 10. In the embodiment of FIG. 1, testing tube 16 extends entirely within concrete structure 10. Testing tubes 16 can be completely or partially transparent in order to provide visual access for inspection of concrete structure 10. Testing tubes 16 are formed of materials that are not reactive to being in contact with concrete. Testing tubes 16 are also not formed of material that affect the chemical properties of the concrete. As an example, testing tubes 16 are not formed of an aluminum material.

Testing tubes 16 can be flexible or rigid. Testing tubes 16 can be attached to reinforcing material 12 prior to pouring the concrete in order to maintain the position of testing tubes 16 within concrete structure 10 and to provide stability to testing tubes 16 during concrete pouring. As an example, clamps can be used to fix testing tubes 16 to reinforcing material 12. The attachment of testing tubes 16 to reinforcing material 12 is especially useful for maintaining the position of testing tubes 16 and providing stability to testing tubes 16 when testing tubes 16 are flexible tubes.

Testing tubes 16 can be manufactured as a continuous element or can be delivered to the site of concrete structure 10 in pieces that are assembled and installed at the site. Testing tubes 16 can be made up of the shapes and lengths that result in the system for condition assessment 14 being suitable for the inspection or testing of concrete structure 10. In the example embodiment of FIG. 1, there are two branches of testing tubes 16. In alternate embodiments, testing tubes 16 can have other branched configurations with more than two branches, or can have a single branch. A formed material can have branched or unbranched testing tubes, or a combination of branched and unbranched testing tubes, and there can be one or more independent testing tubes in the formed material. A testing tube can have one or more entry points.

Testing tubes 16 can extend within concrete structure essentially parallel and in close proximity to any surface of concrete structure 10. Alternately, testing tubes 16 can extend at an angle relative to any surface of concrete structure 10 or can extend in any direction relative to a surface concrete structure 10. In the embodiment of FIG. 1, testing tubes 16 have a terminal end 18 that is embedded in concrete structure 10. Terminal end 18 of testing tube 16 is closed in order to prevent the ingress of external materials.

Access tube 20 is in contact with the concrete structure 10 and has a testing end open to testing tube 16. Access tube 20 has an internal bore sized to provide passage for a testing tool. Access tube 20 of the example embodiment of FIG. 1 extends from a branch of testing tube 16 in a generally vertical direction out of the top surface of concrete structure 10. Access tube 20 can include tube cap 22. Tube cap 22 is located at a cap end of the access tube, the cap end being opposite the testing end of the access tube. Tube cap 22 prevents the ingress of dust, rain or other water sources, oil from operating equipment, or any other material that can cause difficulty reaching or performing any testing through access tube 20.

The external features of the system for condition assessment 14 include access pipe 24. Access pipe 24 is in connection with access tube 20 and can be a separate member from access tube 20. Access pipe 24 can be oriented as a continuation of access tube 20. Access pipe extends in any direction towards access tube 20. Access pipe can extend in a direction generally perpendicular to testing tube 16. Access pipe 24 can have a larger inner diameter than the outer diameter of access tube 20. Access pipe 24 extends from access tube 20 and has an access opening sized to provide passage for a testing tool. The access opening is at a terminal end of access pipe 24 that is opposite the junction of the access pipe and access tube 20.

A portion of access pipe 24 can circumscribe access tube 20. In certain embodiments, access tube 20 can project out of concrete structure 10 so that access pipe 24 does not need to be embedded in concrete structure 10. As an example, access tube 20 can extend 10 cm out of concrete structure 10.

In alternate embodiments, access tube 20 can be flush with a surface of concrete structure 10 and access pipe 24 can be partially embedded within concrete structure 10. In such an embodiment, the embedding of access pipe 24 within concrete structure 10 can provide stability to access pipe 24 and can protect access tube 20 from damage. As an example, access pipe 24 can be embedded 10 cm within concrete structure 10 and can extend 10 cm to 15 cm out of concrete structure 10.

A sealing or wrapping material can be provided in the region between concrete structure 10 and contact areas or points that provide access for possible water ingress inside concrete structure 10. As an example, a sealing or wrapping material can be provided in the region between concrete structure 10 and access pipe 24 to avoid the accumulation of moisture around access pipe 24 or testing tubes 16.

In certain embodiments, extension pipe 26 can be secured to access pipe 24 to further extend the access point to the system for condition assessment 14 away from concrete structure 10. The joint between access pipe 24 and extension pipe 26 can be threaded or an adhesive type connection that will minimize the possibility of water ingress or contaminants through the connection.

Access pipe 24 and any extension pipe 26 can provide the opening point through which tools are inserted to inspect concrete structure 10. Access pipe 24 and any extension pipe 26 can have the access opening at a terminal end. The access opening is spaced apart from concrete structure 10. The access opening is sized to provide passage for a testing tool through the access opening to reach testing tube 16.

Access cap 30 is located at the access opening of access pipe 24 or extension pipe 26. Access cap 30 prevents the ingress of dust, rain or other water sources, oil from operating equipment, or any other material that can cause difficulty reaching or performing any testing through access pipe 24 or extension pipe 26. In the example embodiments, one access pipe 24 is shown. In alternate embodiments there can be additional access pipes 24 providing additional opening points through which tools are inserted to inspect concrete structure 10. When the access opening is at or above grade, the access pipes 24 and extension pipe 26 can be removable or omitted. The position of tube cap 22 is at or proximate to an outer surface of concrete structure 10 so that there is no projection of access tube 20 that could pose a safety risk, such as a tripping or falling risk for operators.

Although testing tubes 16 of FIG. 1 have been shown as being completely located within concrete structure 10, in alternate embodiments, portions of testing tubes 16 can be located external of concrete structure 10. Although access tube 20 is shown in FIG. 1 as extending vertically out of a top surface of concrete structure 10, in alternate embodiments, access tube 20 can extend at an angle and out of a side surface of concrete structure 10. In other alternate embodiments, access tube 20 can meet testing tube 16 outside of concrete structure 10.

Figure 2:
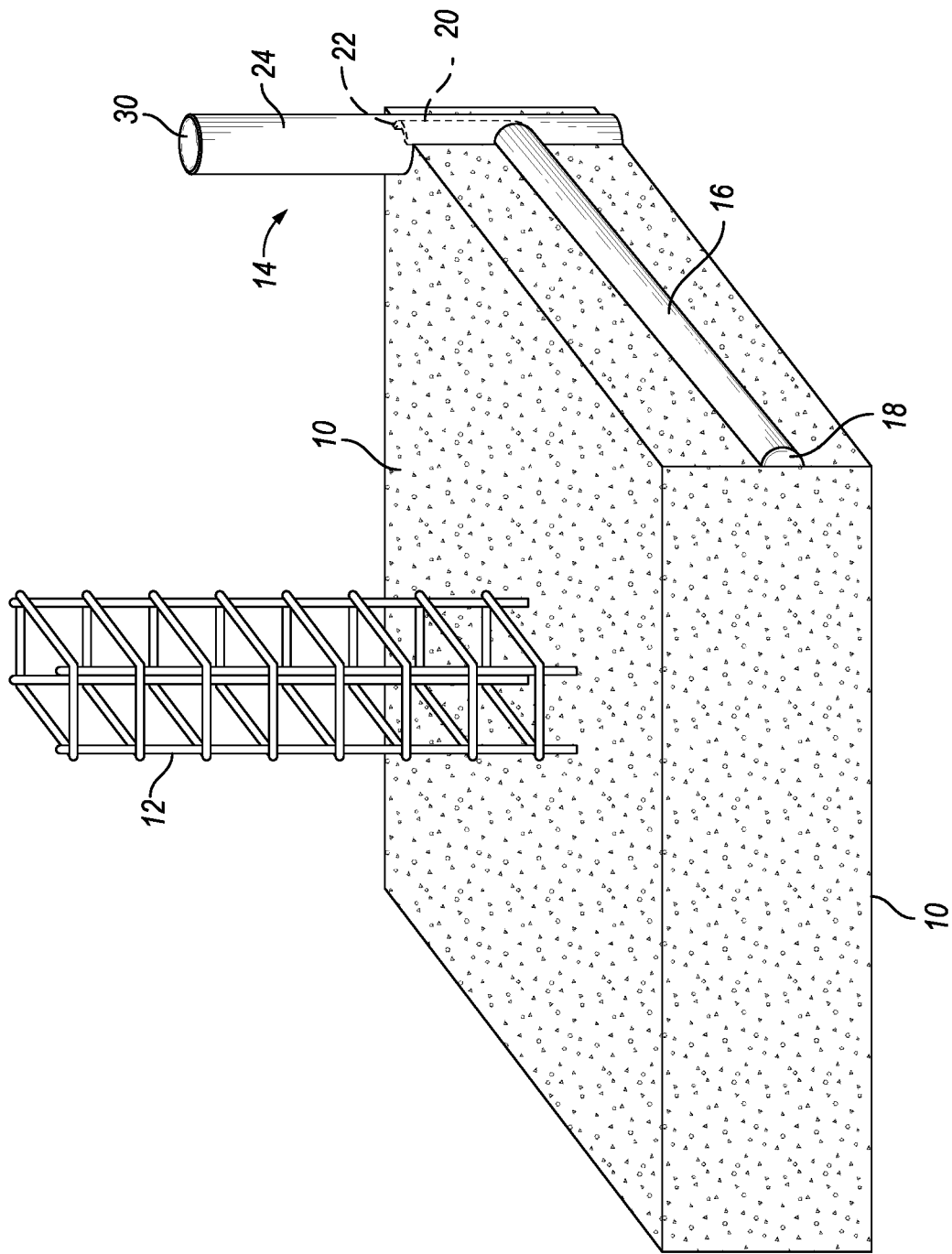
FIG. 2 is a schematic perspective view of a concrete structure with a pre-installed system for condition assessment, in accordance with an alternate embodiment of this disclosure.

Looking at FIG. 2, in alternate embodiments, testing tubes 16 can be secured to an outer surface of concrete structure 10. In such an embodiment, testing tubes 16 can be flexible or rigid. Testing tubes 16 can be transparent to allow for visual inspection of concrete structure 10 or its surroundings. Alternately, testing tubes 16 can be formed of a portion of a tube, such as a channel and can be open in the area adjacent to concrete structure 10.

In the example embodiment of FIG. 2, testing tube 16 is a channel such that an open cross section of testing tube 16 is a half-circle, U shape, or other shape. The open side of the channel shaped testing tube 16 is open to concrete structure 10. In this way, the outer surface of concrete structure 10 is exposed to a tool that is run through testing tube 16. In such an example, terminal end 18 of testing tube 16 is semi-circular shaped. Testing tube 16 can be secured to an outer surface of concrete structure 10 with adhesive sealant or by mechanical methods.

In the example embodiment of FIG. 2, access tube 20 is also a channel with the open side of the channel shaped access tube 20 being open to concrete structure 10. When the access opening is at or above grade, the access pipes 24 can be removable or omitted. The position of tube cap 22 is at or proximate to an outer surface of concrete structure 10 so that there is no projection of access tube 20 that could pose a safety risk, such as a tripping or falling risk for operators.

Access pipe 24 can be a separate member from access tube 20, as shown in the example embodiment of FIG. 2. In alternate embodiments, access pipe 24 can be a continuation of access tube 20 so that access pipe 24 and access tube 20 are a single member. The bottom of access pipe 24 can be shaped to cover and seal the opening of the testing tube 16 while resting firmly on concrete structure 10. A sealing material can be applied where access pipe 24 meets the surface of concrete structure 10 to prevent water and other contaminants from entering access pipe 24 where access pipe 24 meets the surface of concrete structure 10. Clamps can be used to fix access pipe 24 to concrete structure 10.

In other alternate embodiments, access pipe 24 can be a flexible member that is coupled to access tube 20. The flexible access pipe 24 can be, for example, a hose. In such an embodiment, access tube 20 can extend 10 cm to 15 cm out of concrete structure 10. In other alternate embodiments, testing tube 16, access tube 20, and access pipe 24 can each be formed of a flexible member.

The external embodiment of the system for condition assessment 14 of FIG. 2 is useful, for example, in case there is a need for continuous monitoring of concrete structure 10 in a severe environment conditions, such as a near shore critical pipe rack or a foundation. An external embodiment of the system for condition assessment 14 can be installed after excavation around an existing foundation for maintenance or inspection reasons or can be installed during the construction of concrete structure 10.

Figure 3:
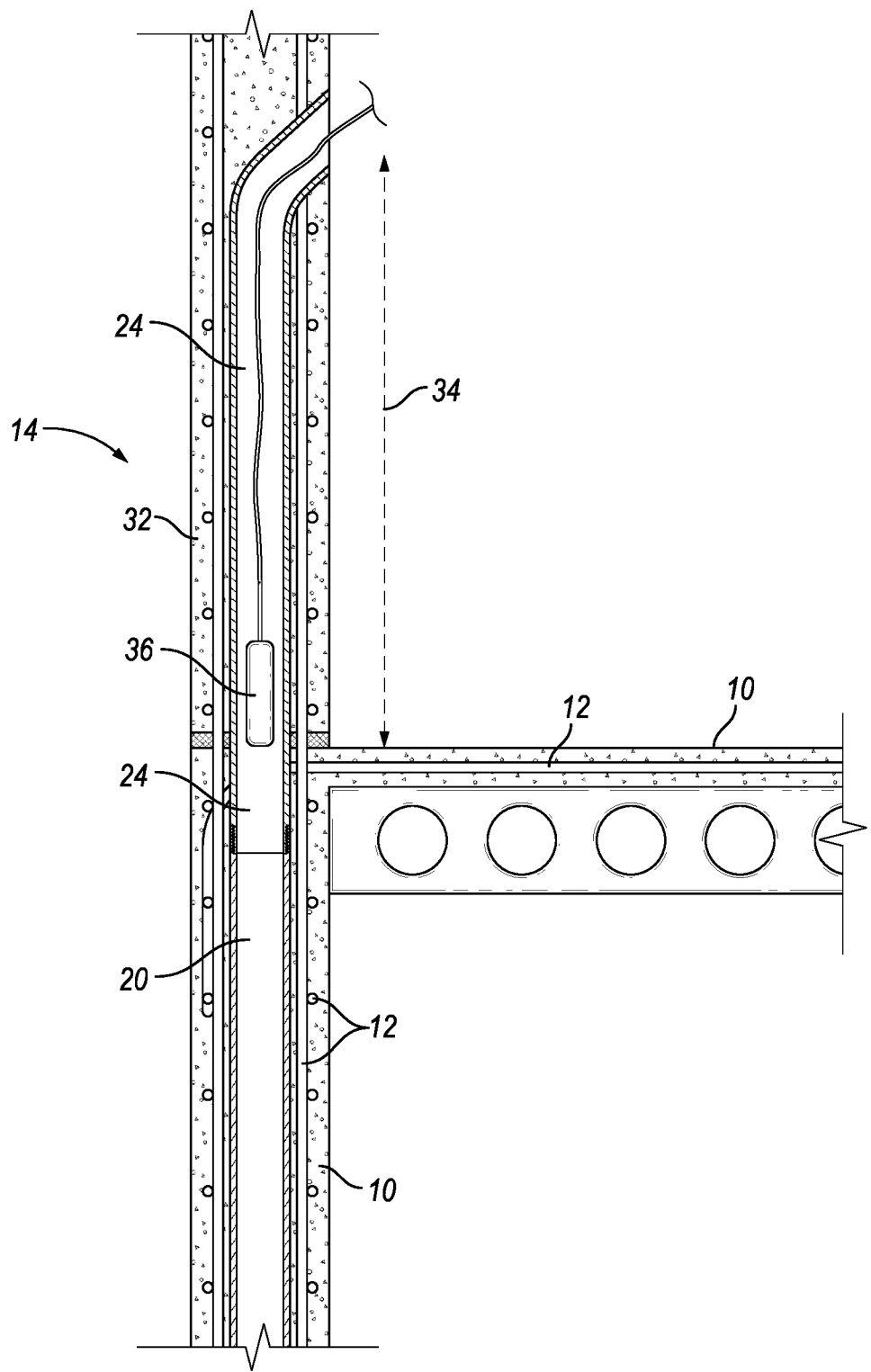
FIG. 3 is a cross section view of a concrete structure with a pre-installed system for condition assessment, in accordance with an alternate embodiment of this disclosure.

Looking at FIG. 3, access pipe 24 can be constructed within or along a manufactured element of the formed material 10. In an example embodiment, the manufactured element can be a column or wall 32. Access pipe 24 can extend along the column or wall. In such an embodiment, the height 34 of access opening of access pipe 24 varies.

Positioning access pipe 24 adjacent to or within column or wall 32 is particularly useful where corrosion is expected.

In an example of operation the system for condition assessment 14 can be made part of concrete structure 10 and used for inspection and testing of concrete structure 10. The system for condition assessment 14 provides access to internal parts of concrete structure 10 for condition assessment. A testing tool 36 can be lowered into the system for condition assessment 14 for obtaining a physical concrete sample or for visualizing the concrete. As an example, testing tool 36 can be a directional drill, a vacuum, a borescope, or other testing or inspection tool. In embodiments where testing tool 36 is a borescope, the borescope can be equipped GPS or measurement scale on the cord for locating the position or distance of a tested spot or location.

In order to obtain a sample of concrete structure 10 for chemical or other physical testing, a directional drill is used to generate powder that is collected by a vacuum for chemical analysis. The drill sides can be supported with rims to protect the system for condition assessment 14 from damage during drilling. In embodiments of this disclosure, the drill can be directional. The drill can have one-side opening for the blades to take concrete sample and not damage the tube. The drill head can be made of a material that collects sample and not damage the tube material.

When testing tube 16 is internal of concrete structure 10, such as in the example embodiment of FIG. 1, in order to obtain a clean sample of the concrete structure 10 for chemical analysis, an operator can drill through closed terminal end 18 until concrete is reached. A vacuum can then be used to suck up and remove the resulting debris. The drill can then be used again to obtain a clean concrete sample for the chemical analysis. Current practice does not allow for in-depth sample collection, embodiments of this disclosure provides access and mechanism for in-depth sample collection. This sample is expected to better reflect the internal condition of the concrete structure as opposed to a sample extracted from structure surface through coring.

When testing tube 16 is external of concrete structure 10, such as in the example embodiment of FIG. 2, in order to obtain a clean sample of the concrete structure 10 for chemical analysis, an operator can drill directly from testing tube 16 into an exposed portion of concrete structure 10.

A borescope can be used for visual inspection of concrete structure 10. The borescope can be flexible and equipped with light and optical lenses and recording capabilities. For example, a video taken by the borescope will allow the inspector to capture photos or films, document the findings, and share the results. Such testing methods are developed to examine the concrete structure 10 internally and provides a direct access to visualize the structure internally, as opposed to some currently available methods that only visualize a concrete structure indirectly.

The camera of the borescope can be rotatable and provide a view from different angles with a digital zoom function. Such a system can be used to view different directions within concrete structure 10. The borescope can be wired or wireless. Borescopes are available in lengths ranging from 5 cm to 300 meters and with diameters of 0.37 mm to 25 cm. The borescope can be used to view concrete structure 10 through a transparent testing tube 16. Alternately the borescope can be used to view concrete structure 10 along an exposed portion of concrete structure 10 along testing tube 16.

Embodiments of this disclosure therefore provide systems and methods for the development of inspection and testing system consisting of preinstalled access tubes in or attached to a concrete structure. The system utilizes probes for structure examination, and drills and vacuum for obtaining and extracting samples. The inspection system can be totally embedded inside the concrete structure, attached externally to the concrete structure, or a mix of both. The system can be used to perform visual inspection and other tests and assess the condition the structure, such as identifying cracks and corrosion of the concrete structure. Although this disclosure describes the use of a system as part of a concrete structure, the system can also be used with materials other than concrete. The system of this disclosure can be used in connection with structures that are fabricated of formed materials. As used in this disclosure, the term "formed materials" includes casted material and additive manufactured materials. Casted materials can include cements, concrete, gypsum, or other materials that are formed by casting. Additive manufactured materials can include materials that are formed by 3-D printing, selective laser melting, electron beam manufacturing, or other additive techniques.

Embodiments of this disclosure can be non-destructive but are not limited to examining surface concrete defects. Embodiments of this disclosure also allows for access for physical and chemical examination of the internal or external parts of the concrete structure. Inspection of buried concrete structures can be performed without the need for excavation. Systems and methods of this disclosure also allow for direct access to examine the concrete structure internally and externally, both physically and chemically.

Currently available test methods depend on scanning or sensors to probe structure, and some require drilling holes for internal probing which can cause damage to the structure. In addition, embodiments of the current disclosure allow for deeper evaluation (from the surface of the concrete) without any post construction damage or intrusion to the structure and does not require work permit such as in a case the test is conducted in operating facilities.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for condition assessment of a formed material, the system including:
   a testing tube embedded in the formed material, the formed material comprising a concrete structure;
   an access tube embedded in the formed material and with a testing end open to the testing tube and an opposite end in communication with outside of the formed material; and
   a tube cap located at a cap end of the access tube, the cap end being opposite the testing end of the access tube;
   where the access tube has an internal bore sized to provide passage for a testing tool, so that when the testing tool is inserted into the access tube, the testing tool is deployable to within the testing tube, where the testing tube comprises a first testing tube, the system further comprising a second testing tube embedded in the concrete structure and that is independent from the first testing tube, where the first and second testing tubes each have multiple entry points, and where the first and second testing tube are transparent to allow for visual inspection of the concrete structure.

2. The system of claim 1, where the concrete structure has substantially planar outer upper surface and outer side surfaces that are substantially planar, where the outer side surfaces are substantially perpendicular to other outer side surfaces and are perpendicular to the outer upper surface.

3. The system of claim 1, where the testing tube comprises a channel such than an open cross section of testing tube is a half-circle and open to the concrete structure, so that when the testing tool is deployed to inside the testing tube, the testing tool is selectively put into direct contact with the side outer surface of the concrete structure.

4. The system of claim 1, further including:
an access pipe extending from the access tube to an access opening; and
an access cap located at the access opening of access pipe; where
the access opening is at a terminal end of the access pipe opposite a junction of the access pipe and the access tube;
the access opening is spaced apart from the formed material; and
the access opening is sized to provide passage for a testing tool through the access opening to reach the testing tube.

5. The system of claim 4, where the access pipe extends along a manufactured element of the formed material and where the access pipe is removable.

6. The system of claim 1, where the concrete structure is selected from the group consisting of a concrete slab, a foundation, and part of a building.

7. The system of claim 1, wherein the concrete structure includes interior reinforcement material comprising rebar, wherein the rebar is elongated and solid, and where the testing tube is attached to multiple segments of rebar that are oriented oblique to the testing tube.

8. The system of claim 4, where the concrete structure comprises a slab portion and an attached wall that is perpendicular to the stab portion, and where the access pipes within the wall.

9. The system of claim 1, where a terminal end of the testing tube is embedded within the formed material and is drillable so that a sample of the concrete structure is obtained.

10. The system of claim 1, where the testing tool comprises a device selected from the group consisting of a directional drill, a borescope, and a vacuum for sample collection.

11. A method for assessing a condition of a formed material with a system for a condition assessment, the method including:
creating the formation by pouring an amount of concrete over a testing tube having a closed end to form a concrete slab with the closed end of the testing tube embedded inside;
locating an access tube in contact with the concrete slab such that a testing end of the access tube is open to the testing tube;
locating a tube cap at a cap end of the access tube, the cap end being opposite the testing end of the access tube;
passing a testing tool through an internal bore of the access tube to reach the testing tube; and
inspecting the concrete slab by deploying the testing tool to inside of the testing tube, where the testing tube comprises a first testing tube, the system further comprising a second testing tube embedded in the concrete structure and that is independent from the first testing tube, where the first and second testing tubes each have multiple entry points, and where the first and second testing tube are transparent to allow for visual inspection of the concrete structure and drilling through the closed end.

12. The method of claim 11, further comprising maintaining a position of the testing tube by attaching the testing tube to reinforcement material prior to pouring the concrete, wherein the reinforcement material comprises a plurality of elongated rebar members.

13. The method of claim 11, where positioning the testing tube in contact with the concrete slab includes, securing the testing tube to an outer surface of the concrete slab, and wherein the testing tube has a channel like configuration so that the concrete slab is directly accessible from within the testing tube.

14. The method of claim 11, further including:
extending an access pipe from the access tube to an access opening;
locating an access cap at the access opening of access pipe,
extending the access pipe along a manufactured element of the concrete slab;
extending the testing tube in any direction relative to a surface of the concrete slab, and extending the access pipe in any direction towards the access tube;
where the access opening is at a terminal end of the access pipe opposite a junction of the access pipe and the access tube and the access opening is spaced apart from the concrete slab; and
passing a testing tool through the access opening to reach the testing tube.

15. The method of claim 11, wherein the testing tube is transparent and the concrete slab is visually inspected from within the testing tube.

16. The method of claim 12, wherein the tube is manufactured as a continuous element and delivered in pieces to a site where the concrete structure is formed, and where the pieces are assembled and installed at the site.

17. The method of claim 11, further comprising forming branches of the testing tube within the concrete slab.

18. The method of claim 11, where the testing tool is a directional drill, and the method further includes obtaining a sample from the concrete slab by drilling into the concrete slab with the directional drill after drilling through a terminal end of the testing tube that is embedded in the concrete slab.

19. The method of claim 11, where the testing tool is a borescope, and the method further includes visually inspecting the concrete slab with the borescope.

* * * * *